Patented Sept. 2, 1941

2,254,865

UNITED STATES PATENT OFFICE 2,254,865

INK FOR GLASS

John C. Wilson, East Orange, N. J., assignor to Westinghouse Electric & Manufacturing Company, East Pittsburgh, Pa., a corporation of Pennsylvania No Drawing. Application October 31, 1939, Serial No. 302,117

6 Claims. (Cl. 106—20)

This invention relates to inks and, more particularly, to a special ink which may be applied to the surface of glass or other smooth material, to produce thereon a monogram, trade-mark or other indicia.

The principal object of my invention, generally considered, is to produce an ink particularly adapted to apply a mark to the inside surface of a clear or inside frosted lamp bulb.

Another object of my invention is to produce an ink which may be employed to produce monograms or the like, in black or any desired color, on a hard smooth surface, such as clear or frosted glass.

Other objects and advantages of the invention will become apparent as the description proceeds.

In the manufacture of glassware and other articles of vitreous material, and especially in making lamps, it is desirable to mark the glass bulbs thereof with the manufacturer's trademark or monogram. Formerly it was customary to apply the monogram to the outside of the bulb, and for that purpose, an ink was devised which produced a mark resistant to abrasion, as described and claimed in the Fredenburgh Patent #1,538,890, issued May 26, 1925, to the assignee of the present application.

With the advent of machinery to satisfactorily print on the inside of the bulb, the desirability of outside printing has disappeared as well as the necessity for an ink which produces an abrasion-resisting mark. It is, therefore, now merely necessary to produce an ink which gives a desired impression, even though it is not abrasion-resisting.

In accordance with my invention, I have developed an ink which is cheaper and better for the purpose than that of the patent referred to, and although preferably black, it may be made of a desired color by correspondingly changing the pigment. This ink is suitable for printing a manufacturer's trade-mark or other special marking on the inside surface of clear or inside frosted lamp bulbs, and becomes permanent without being "burned," as has been necessary with some inks in the past. Because of the absence of heat to set the impression, the danger of bulb strain due to excessive heating is eliminated.

The ink produced in accordance with my invention, produces a pleasing impression on the finished lamp when the same is either cold or lighted.

The ink of my invention, comprises a pigment which, if a black mark is desired, is preferably lamp black. It will, however, be understood that cobalt black may be substituted for lamp black, and if a colored mark is desired, an appropriate colored pigment may be alternatively employed. In addition to the pigment I preferably use a mineral bonding agent or filler, which desirably consists of titanium oxide.

In order to give the desired tackiness to the ink to facilitate application thereof by means of a rubber stamp, I use a small proportion of argentic (silver) oxide. As a vehicle for my ink, I desirably employ glycerine (glycerol).

A preferred formula for black ink, is as follows:

|  | Approximate percentage by weight |
|---|---|
| Lamp black, 50 grams | 20.9 |
| Titanium oxide, 10 grams | 4.2 |
| Argentic oxide, 3 grams | 1.2 |
| Glycerine (desirably chemically pure), 140 cc. (176.4 grams) | 73.7 |
|  | 100.0 |

The ink is desirably prepared by thoroughly mixing the titanium oxide, lamp black and argentic oxide in a dry state, as in a mixing bowl, after which the glycerine, desirably heated to a temperature of 60° C. is gradually added, during which the mass is constantly stirred.

When the mixing operation is complete, the ink should be passed through a paint mill in order to produce a smooth homogeneous mixture. The ink is desirably applied in the same way as other paste monogram inks, that is, by spreading a portion on a plate, rolling it out with a proof roller, then pressing the rubber stamp on the plate and transferring the ink by means of said stamp to the glass bulb, or other surfaces to be printed. A means for printing on the inside of lamp bulbs is described and claimed in the Rowe application Serial No. 243,113, filed November 30, 1938, now Patent No. 2,201,302, dated May 21, 1940, and owned by the assignee of the present application.

Although a preferred formula for my ink has been disclosed, it will be understood that variations may be made without departing from the spirit and scope of my invention as defined by the appended claims. For example, the proportion of lamp black or other pigment may be varied to a certain extent, for example, plus or minus 5%. The titanium oxide may, likewise, be varied as by using from 8 to 12 grams in the formula above disclosed. Likewise, a small variation, of say plus or minus ½%, is permissible for the argentic oxide.

I claim:

1. An ink comprising lamp black, titanium oxide, argentic oxide, and glycerine, mixed in the proportion of about fifty grams of lamp black, about ten grams of titanium oxide, about three grams of argentic oxide and about one hundred and fifty cubic centimeters of glycerine.

2. The process of producing a smooth ink which comprises intimately mixing lamp black, titanium oxide and argentic oxide in the proportions of about fifty grams of lamp black, about ten grams of titanium oxide, and about three grams of argentic oxide, then gradually adding heated glycerine in the proportion of about one hundred and fifty centimeters, stirring constantly, and finally passing the mixture through a paint mill.

3. An ink comprising lamp black about 20.9% by weight, titanium oxide about 4.2% by weight, argentic oxide about 1.2% by weight, and glycerine about 73.7% by weight.

4. An ink comprising about 20.9% pigment by weight, about 4.2% mineral filler by weight, about 1.2% argentic oxide by weight, and about 73.7% glycerine by weight.

5. The process of producing a smooth ink which comprises intimately mixing lamp black, titanium oxide and argentic oxide in the proportions of about 20.9% by weight of lamp black, about 4.2% by weight of titanium oxide and about 1.2% by weight of argentic oxide, then gradually adding glycerine until it comprises about 73.7% by weight of the mixture, stirring constantly, and finally passing the mixture through a paint mill.

6. The process of producing a smooth ink which comprises making a mixture consisting of about 20.9% pigment by weight, about 4.2% mineral filler by weight, and about 1.2% argentic oxide by weight, then gradually adding glycerine until it comprises about 73.7% of the mixture by weight, stirring constantly, and finally passing the mixture through a paint mill.

JOHN C. WILSON.